Jan. 3, 1939.  F. L. WHITE  2,142,468
MACHINE FOR MAKING HOT TAMALES AND OTHER FOOD PRODUCTS
Filed Aug. 8, 1938   4 Sheets-Sheet 1
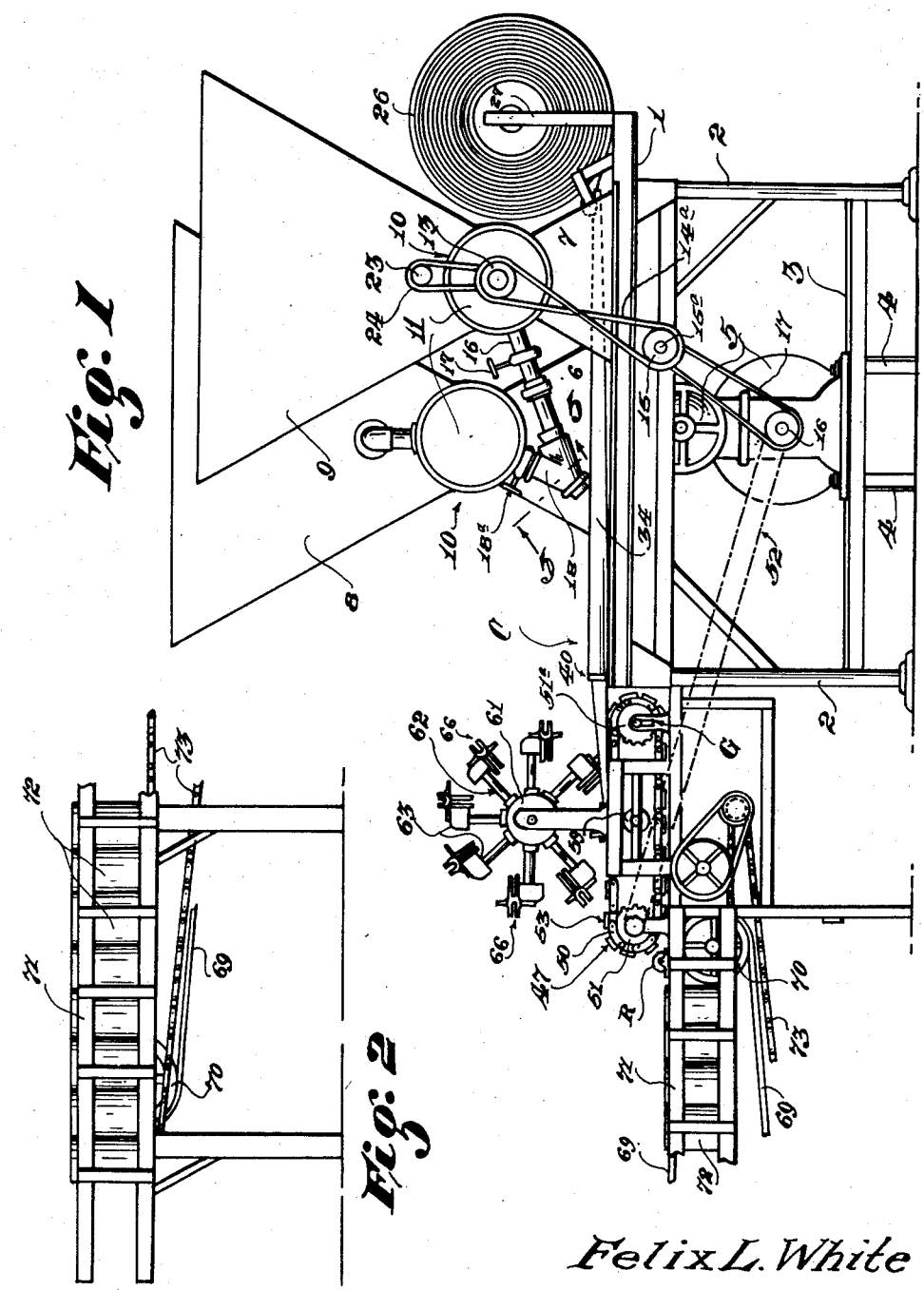
Felix L. White
INVENTOR.
BY John M. Spellman
ATTORNEY.

Jan. 3, 1939.  F. L. WHITE  2,142,468
MACHINE FOR MAKING HOT TAMALES AND OTHER FOOD PRODUCTS
Filed Aug. 8, 1938  4 Sheets-Sheet 2
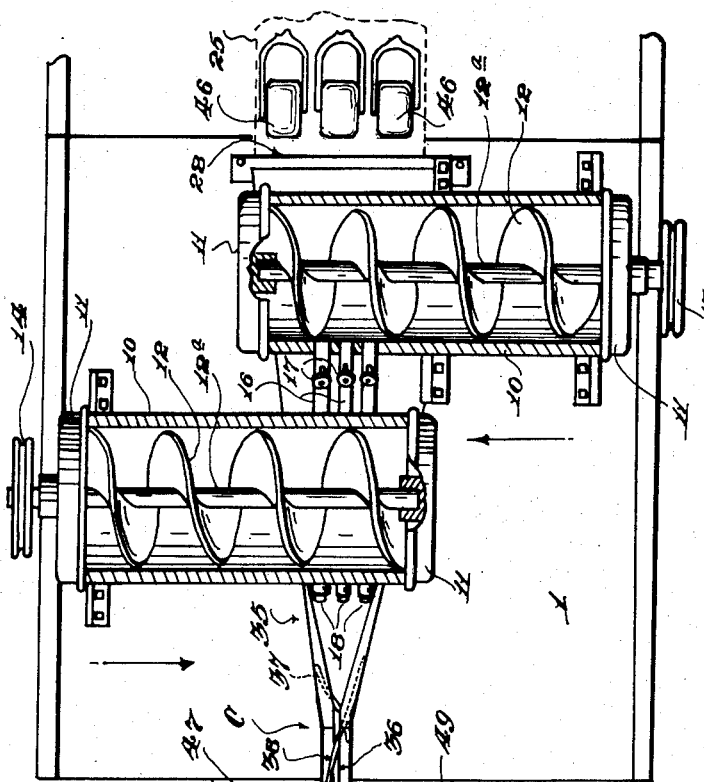
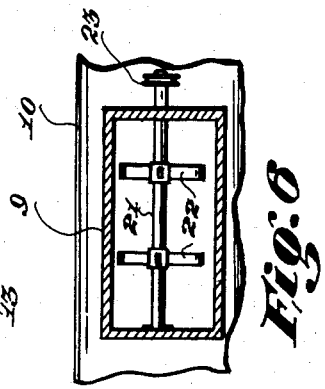
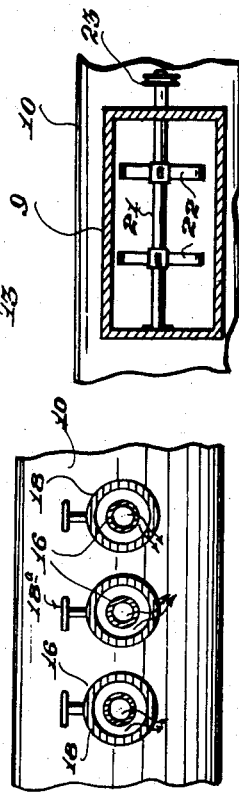
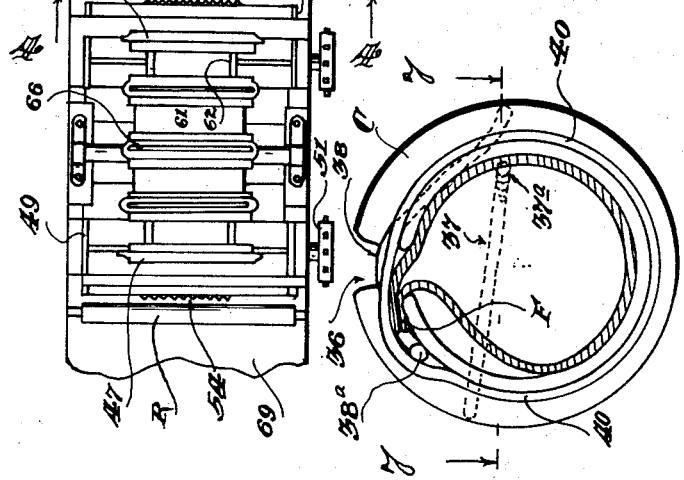
Felix L. White
INVENTOR.
BY John M. Spellman
ATTORNEY.

Felix L. White
INVENTOR.
BY John M. Spellman
ATTORNEY.

Jan. 3, 1939.   F. L. WHITE   2,142,468
MACHINE FOR MAKING HOT TAMALES AND OTHER FOOD PRODUCTS
Filed Aug. 8, 1938   4 Sheets—Sheet 4
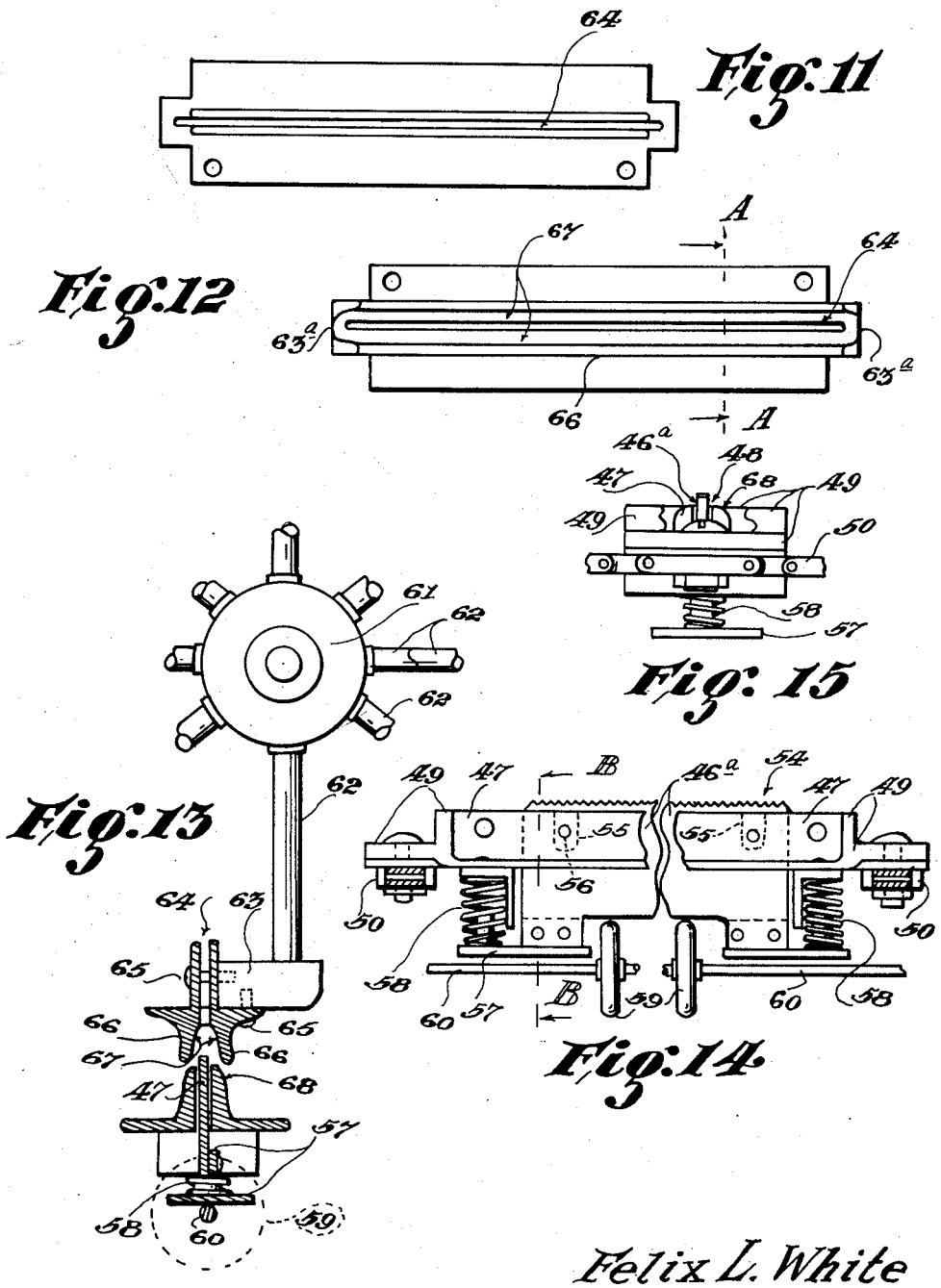
Felix L. White
INVENTOR.
BY John M. Spellman
ATTORNEY.

Patented Jan. 3, 1939

2,142,468

UNITED STATES PATENT OFFICE 2,142,468

MACHINE FOR MAKING HOT TAMALES AND OTHER FOOD PRODUCTS

Felix L. White, Dallas, Tex.

Application August 8, 1938, Serial No. 223,600

14 Claims. (Cl. 93—2)

This invention relates to machines for putting food stuffs, in a mass form, into a condition for public distribution and sale. In this connection the invention is especially intended for the purpose of forming, shaping, cutting and folding tamales, from a tamale and meal mass to a product ready for packing and consumption.

Broadly stated, the machine embodying the invention is so constructed that it will deliver the material in a stream upon a continuous wrapper in the form of a strip or strips of paper. The wrapper and the material are made to travel along and upon a partial folding means to a novel arrangement of co-acting instrumentalities where it is finally completely folded, cut and the ends partly folded to form a tamale and delivered onto a traveling belt for packing into suitable containers.

The invention includes novel features for bringing about the folding and cutting of the tamale material and its covering strip, whereby the tamale is held after being severed in such a manner that the tamales are continuously fed from the machine without clogging or jamming.

Other objects of the invention include specific means for feeding the paper strip or strips or suitable tamale covering into the machine; means for preventing the jamming or clogging of the material mass being fed onto the strips; and means for guiding the paper strips or tamale covering along the traveling path thereof in the initial stages of partial turning of the paper strips.

With the foregoing and further objects in view, the invention will be clearly understood from a perusal of the following detailed description, taken in connection with the accompanying drawings and in the drawings:

Figure 1 is a side elevational view of the machine embodying the invention, and partly broken away;

Figure 2 is a side elevational view, slightly enlarged and showing a continuation of Figure 1;

Figure 3 is a top plan view of Figure 1, partly broken away, and partly in horizontal section;

Figure 4 is an enlarged end elevational view of Figure 3, the view being had on the line 4—4 of said figure;

Figure 5 is an enlarged cross-sectional view of Figure 1, the view being had along the line 5—5 thereof;

Figure 6 is a cross-sectional view through the throat of one of the hoppers showing a stirring means;

Figure 11 is a bottom view of one of the tamale cutting elements, removed from the machine, Figure 12 being a top plan view of said element;

Figure 13 is a fragmentary detail view enlarged of the tamale cutting and holding means, in broken formation, the lower portion being in cross-section and taken along the respective lines A—A and B—B of Figures 12 and 14;

Figure 14 is a side elevational view in broken formation of one of the tamale cutting knives and co-acting parts per se;

Figure 15 is an end elevational view, partly broken away, of Figure 14—rollers not shown; and Figure 16 is a side elevational view of a paper strip receiving means.

Figure 7:
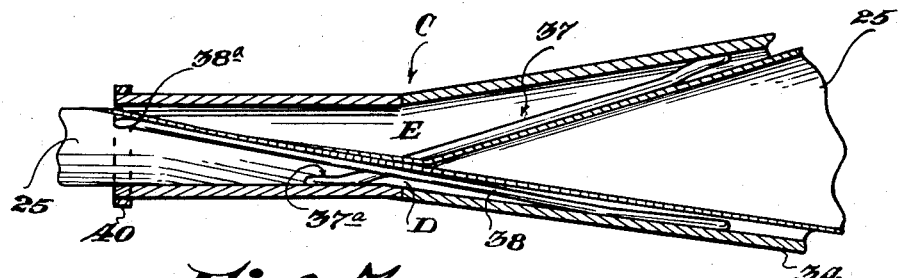
Figure 7 is a partial longitudinal sectional view through the tamale delivering tube.

In carrying out the invention there is provided a table or support 1 with legs 2, suitably braced, and having rails 3, with legs 4 for the holding and support of a motor 5. The motor provides power for operating the entire machine.

Mounted on the table 1 and positioned on the supports 6 and 7, are hoppers 8 and 9, the hopper 8 being provided for meal dough and the hopper 9 adapted to contain the ready mixed meat product of the tamale. Each of the hoppers is attached to a cylinder 10, properly closed at each end by the caps 11, these cylinders being placed in parallel relationship to each other and so spaced that the inner ends thereof overlap as shown in Figure 3.

Inside each of these cylinders is placed a specially constructed pressure feed screw designated at 12, the shafts 12—a having mounted thereon a pulley 13 and a pulley 14. The pulley 13 is rotated through a belt 14—a connected to a pulley 15. Pulley 15 is powered by the motor 5 through a pulley drive 16 and belt 17. The feed screw shaft driven by the pulley 13 forces the meat product toward the end of the cylinder as indicated in the direction of the arrow. The feed screw shaft rotated by the pulley 14 in the meal dough hopper is turned by a pulley not shown on the shaft 15—a which extends underneath the table to the opposite side thereof and is connected to the pulley 14 by a suitable belt similar to the belt 14—a. The feed screw of the meal dough hopper is thus rotated to force the contents of this hopper in the direction of the arrow placed adjacent thereto and as carried out the meal dough and the meat products are thus made to direct and bring the product to a meeting point at the overlapping ends of the cylinders. The meat content is thus forced out through the pipes 16, each of the pipes having a control valve 17. The meal dough is forced from its cylinder into the Y-shaped elements 18, to which the pipes 16 are also connected and as shown in Figure 5 the elements 18 are of larger diameter than the pipes 16, the pipes 16 passing therethrough and the meal dough is thus enabled to pass entirely around the pipes 16—the meal dough and meat content thus coming together in the delivery end of the discharge means and being deposited onto the paper strip. Control valves 18—a are provided in the end of the discharge means.

Figure 9:
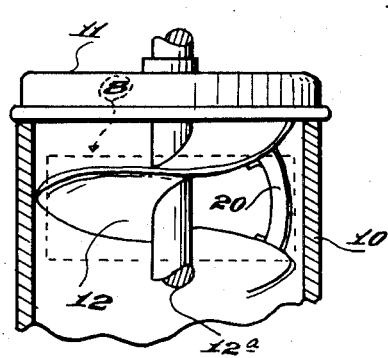
Figure 9 is an enlarged detail sectional view through one of the hoppers showing a knife means on the compressor screw thereof.
Figure 10:
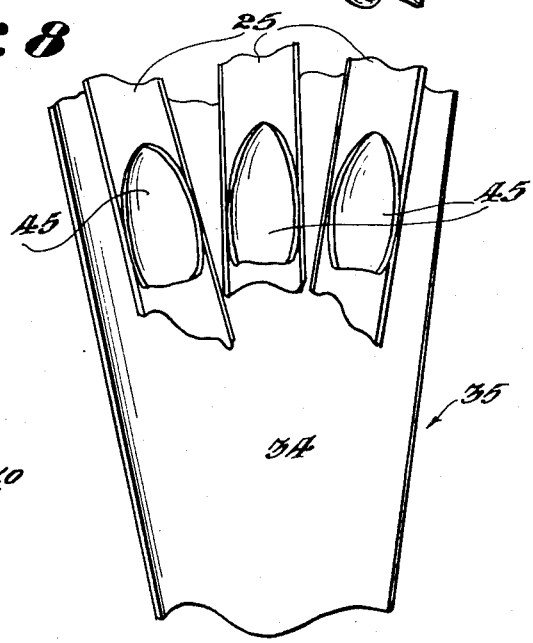
Figure 10 is an enlarged top plan view of a portion of the paper turning means.
Figure 10:
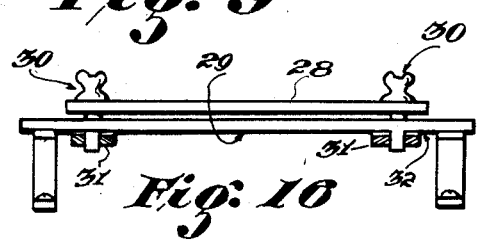

For the purpose of preventing the meal dough and also the meat content from clogging in the hoppers, there is provided, in the meal hopper, see Figure 9, and in the cylinder thereof, a knife 20. This knife is connected between the blades of the screw as shown and as the shaft revolves the knife cuts into the meal dough and prevents an arc compact from forming. In the cylinder of the meat content hopper there is arranged a shaft 21 on which are mounted two or more curved arms 22 and these arms also cut into the meat content of the tamale and prevent jamming of the same in the hopper throat. This shaft 21 is rotated by a pulley 23 and belt 24 connected to a pulley (not shown) on the shaft 12—a carrying the pulley 13. To prevent clogging or jamming of the contents of both hoppers and cylinders there is also arranged a by-pass pipe 11—a, connecting the cylinder to the hopper 8, as shown in Figure 1.

The meat content and the meal dough are thus deposited onto a paper strip or strips, the paper being fed into the machine from a roll or rolls 26, mounted on the support 27. A special means is provided for feeding the paper into the machine, the arrangement being shown in Figure 16. It consists of two strips of material 28 and 29, in spaced parallel relationship, the strip 29 being affixed to the table 1 and the strip 28 being movable with respect to the strip 29 by means of the thumb screws 30—the paper being fed between these strips and adjusted for tightness or looseness of feed by the screws 30, nuts 31 and lock washers 32.

The machine is so constructed that one or more tamale streams may be deposited onto the paper strips as desired by utilizing the control valves previously referred to. In the drawings, three tamale outlets are shown, embodied in the terminal elements 18. When three tamale streams are to be operated, three rolls of paper 26 will be required. This paper in the strip form is fed through the strips referred to and shown in Figure 16, and is fed onto an elongated trough-like piece of material, preferably metal, and shown at 34, and beginning at its end adjacent the paper rolls, this metal trough has its edges turned increasingly inwardly as indicated at 35. The turn-over terminates at approximately the point C where it forms a tube. This portion of the trough is shown in enlarged end elevation in Figure 4, the tube being also shown in longitudinal section in Figure 7. This tube may be made separately from the trough and affixed thereto in any preferred manner.

Figure 8:
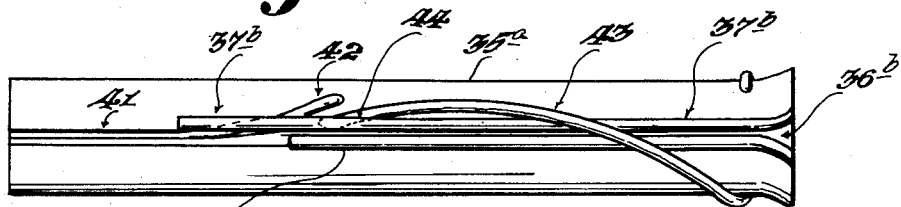
Figure 8 is a top plan view of a modified form of tamale delivering tube.

The converging inwardly turned edges of the trough thus form a slit or longitudinal opening indicated at 36, through and along which the edges of the paper strip pass. In Figure 7 is shown a longitudinal sectional view of the tube and in which are placed two wires 37 and 38, the inner ends of which are fastened to and extend inwardly of the walls of the trough. These wires cross one another at a point D, but one wire is above the other to permit the upper edges of the partly folded paper strip to pass. The wire 37 is shorter than the wire 38 and its outer end 37—a bears against the inner wall of the tube and presses and holds both edges of the paper against the tube walls. The wire 38 extends from the wall of the tube forwardly toward the end thereof and passes out through the opening 36 and rests upon the outer wall of the tube end as indicated at 38—a. A ring 40 holds the end of the tube together and maintains the wire 38 in place. In Figure 7 the paper strip 25 in its partly folded condition is shown being pulled forward between these wires and as the two edges of the paper come together as indicated at E, both edges of the paper are turned over and are folded along the outer wall of the tube as shown at F, passing under the ring 40. Figure 8 shows a modification of the tube and in this form the tube has the slit or opening 36—b extending from end to end thereof and one edge of the tube has a wire 37—b soldered or otherwise affixed thereto, stopping a short distance from the end of the tube. A similarly disposed wire 38—b, but shorter in length is placed on the opposite edge of the tube slit. In this arrangement the outer end of the tube has one edge along the slit extended slightly upwardly as indicated at 41 and is curved as at 42, leaving an opening between the wire 37—b and the curved portions 42 of the marginal extension. A third wire 43 is attached to the tube, is curved over the tube and has its outer end at 44 flattened, the flattened end being free. The edges of the paper strip as the strip is pulled along through the tube pass under the curved wire 43 and the edges of the paper on coming in contact with the curved extension 42 are moved underneath the wire 37—b, resulting in a double fold of the edges of the paper strip.

Arranged in the trough 34 are one or more spoon-shaped members 45, one for each strip of paper being fed through the machine. Each of the strips 25 passes underneath the spoon-shaped member, thereby giving the strip a partial folding effect to be completed by the converging walls of the trough as previously explained. These spoon-shaped members or shapers are placed approximately midway between the two cylinders 10.

The paper feeding mechanism also includes, and as shown in Figure 3, one or more rollers 46, these rollers being adjustable so as to be made to ride over the paper strip or strips to start the strip at the proper angle after the paper has been fed through the strips 28 and 29 shown in Figure 16.

One of the most important features of this invention is the novel means for severing the folded paper strips containing the tamale content into proper lengths and for partly folding the ends of the lengths in a manner suitable for packing into containers for distribution. This means also operates to pull the paper through the machine and holds the cut lengths of tamales properly until the complete product is delivered from one end of the machine. This arrangement consists of a plurality of knives as shown in Figure 14 and indicated at 46—a. These knives are made to reciprocate in a frame member of two spaced parallel pieces of angle iron indicated at 47, the spacing forming a longitudinal slit or opening 48 for the knife 46—a. The ends of these members have welded thereto the pieces 49 which close the slit. The pieces 49 project beyond the frame ends and provide a means for seating the members on a chain 50, the chain being carried around over the sprocket gears 51, as shown in Figure 1. These sprocket gears are operated by the motor through a chain 52. The frame members for each knife are properly spaced by means of a panel or slat 53 so that the knives will cut the tamale at proper intervals in timed relation with the co-ordinating knife receiving means, later to be described. Each of these knives has teeth 54 for severing the paper in which the tamale material is wrapped, and each knife has guide slots 55 for a pin 56. The lower edges of these knives are connected to a plate 57 and on each plate is seated a spring 58—the upper end of the spring bearing against the underside of the members 47. The knife blades are thus made to move upwardly against the tension of the springs as the traveling framework is carried around by the chains 50. This reciprocal movement of the knives is brought about by two or more rollers shown at 59, mounted on the shaft 60, the ends of this shaft being journaled in the framework between the sprocket gears 51.

Mounted on the sides of the framework and above the knife arrangement is a drum 61, shown in fragmentary detail in Figure 13. Radiating from the drum are spokes 62 and on the ends of these spokes are mounted the blocks 63 and carried on the blocks are the knife receiving members shown in Figures 11 and 12. These members consist of two angular pieces having their ends at 63—a joined together and forming a longitudinal slit 64 for passage of the knife blades. Screws 65 hold the members to the blocks 63. The knife receiving channels 66 are slightly spread apart from a right angled position and their inner surfaces as at 67 are curved to complementally receive the curved surfaces 68 of the pieces 47, thereby serving to fold the ends of the tamale units in a manner suitable for packing in containers for distribution.

Another important feature of the invention is the means for holding the tamales after being cut into proper lengths and this is accomplished by the previously referred to arrangement and construction of the curved and rounded surfaces 68 of the knife positioning means and the knife receiving means at 67. These parts serve to hold the tamale and continue the pull of the paper through the machine after the teeth 54 have severed the paper.

After the tamales are cut they are delivered onto a belt 69, traveling over the drums 70, the belt drums being suitably supported in a framework 71 and extending as far in length as to accommodate a required number of operators who pack the tamales in the containers 72. These containers are carried along the sides of the belt 69, below the upper side thereof, and held in the frame by the bars as shown. The arrangement and construction of the framework extension at this end of the machine provides a chain drive 73 running underneath the containers and moving them along at a speed approximately one eighth of the speed of the belt 69. A roller R prevents the tamales from turning about.

The operation of the machine is such that one or more tamale material delivering streams may be operated at one time, the meal dough and the meat mixture being previously prepared and placed in the hoppers and the flow thereof controlled by the valves 17 and 18—a. As the strip or strips of paper covering the tamale material passes through the tube there are two clean surfaces of paper presented for folding. After the folding is accomplished the paper and tamale material are drawn into the path of the knives. The drum 61, with its knife receiving means operates synchronously with the knives, the drum being rotated around as the knives and knife receiving parts come into engagement so that these parts fit exactly in receiving and cutting the tamales. After the tamale is severed the curved and rounded portions referred to hold the tamale covering just long enough and with sufficient tension to pull the paper through the machine until the next cut is to be made by the knife action. One of the sprocket gears 51—a which carries the knives around is also constructed with a slot G in its supporting means so that its shaft may be adjusted to lower or higher positions and this arrangement serves to lengthen and shorten the length of the tamale to be cut.

The upward and downward movement of the knives is accomplished as previously stated by means of the rollers 59, journaled in the framework. These rollers are positioned in the framework and centrally thereof and immediately underneath the position the knife receiving and knife parts come together, the rollers being slightly higher or sufficiently high to engage the lower edge of the knife or knives as they come around and thus force the knives upwardly against the tension of the springs 58. After the tamale is severed the parts move from contact with the rollers and the springs retract the knives within the parts 47.

While the disclosure reveals a practical working embodiment of a machine designed to carry out the purposes described, obviously various modifications may be made therein, without departing from the intent and spirit of the invention, and such as might be said to come fairly within the scope and meaning of the claims appended hereto.

What is claimed as new is:

1. In a machine for making tamales and the like, means for delivering tamale materials to a continuously moving wrapper or web, means for folding the wrapper about the tamale materials while the same are advancing, and means for severing the web into lengths and for folding the ends thereof, said means also operating to pull the web through the machine.

2. A machine as set forth in claim 1, wherein the severing means include knives reciprocable transversely to the direction of travel of the web.

3. In a machine for making tamales and the like, means for delivering the food ingredients upon a continuously moving wrapper or web, means for folding the wrapper about the food ingredients while the same are advancing, and means for simultaneously advancing the wrapper and cutting the wrapped material into suitable lengths, comprising a pair of series of continuously moving complementary gripping members, one series being located above and the other below the web, the members of one series having associated therewith a plurality of reciprocable knives, means for successively reciprocating said knives to cut said wrapper and contents, and means for subsequently retracting said knives.

4. In a machine for making tamales and the like, means for supplying a wrapping web to the machine, means for supplying food ingredients to the web, a web folding means along which the web is propelled and initially partially folded, said web folding means terminating in a tubular member whereby the web is folded on itself by two of its edges to enclose the tamale; and means for severing the web with the tamale material into lengths and for folding the ends thereof, said web severing means also operating to pull the web through the machine.

5. A machine as set forth in claim 4, having means for initially feeding the web to the machine comprising spaced parallel strips of material having adjusting screws at each end thereof, the web being passed through and between said strips.

6. In a machine for making tamales and the like, means for supplying a wrapping web to the machine, means for supplying tamale material to the web, means for folding the wrapper about the tamale material, means for severing the tamales into proper lengths and for folding the tamales at each end, including a plurality of reciprocable knives, mounted in a carrier adapted to revolve beneath the web carrying the tamale material, means for reciprocating the knives, and means associated with the knives in which the knives are complementally received as the severance of the tamale covering is effected, said knives and said knife receiving means co-operating to hold the tamale covering after the severance is made in a manner sufficient to pull the web through the machine.

7. A machine as set forth in claim 6, wherein the knives are mounted in spaced parallel members, means associated with said members for guiding the knives in their cutting movement, resilient means for retracting the knives from said cutting movement, and cam means mounted beneath the knives for contacting the lower edges of the knives during movement of the carrier whereby the knives are moved upwardly in their cutting movement.

8. A machine as set forth in claim 6, wherein the means for receiving each of said knives comprises a pair of spaced parallel members providing a longitudinal opening for the passage of the knife, said receiving members being mounted on a revoluble element disposed above the knife carrying means, said knife carrying means and said knife receiving means having complemental parts for holding the web covering the tamale material after the severance is made, sufficient to prevent the web from slipping and providing a means for pulling the web through the machine as the knife carrying means and the knife receiving means come together in cutting the tamale and wrapper into units.

9. A machine as set forth in claim 6, wherein said knife receiving members are mounted on a revoluble drum having radial arms, each arm carrying a pair of the knife receiving elements, said knife receiving members and the drum being rotated synchronously with said knife carrier, the knife carrying members and knife receiving members being made to register and being spaced to cut the tamale material in proper lengths; and means for varying the length of the tamale to be cut.

10. In a machine for making tamales and the like, means for supplying a wrapping web to the machine, means for supplying tamale material to the web, a web folding means comprising a trough-like element terminating in a tube at one end, said tube having associated therewith elongated elements crossing one another whereby the web is folded one edge upon the other around the tamale material; an auxiliary web folding element in said trough-like element for initially shaping the web to a foldable position; means for severing the tamales into proper lengths and for folding the tamales at each end, comprising a plurality of knives reciprocally mounted in a carrier adapted to revolve beneath the web carrying the tamale material; means for reciprocating the knives; and means associated with the knives in which the knives are complementally received as the severance of the tamale covering is effected, said knives and said knife receiving means co-operating to hold the tamale covering after the severance is made in a manner sufficient to pull the web through the machine.

11. In a machine for making tamales and the like, wherein plastic tamale material is supplied to a continuously moving wrapper or web, a wrapper folding device comprising a trough-like member through which the web is passed, said trough terminating in a tubular member having a longitudinal slit from end to end for passage of the edges of the wrapper in the folding thereof, and means for folding one edge of the wrapper over the other comprising elongated resilient elements secured to the tubular member and extending longitudinally thereof, said members crossing one another intermediate their ends.

12. In a machine for making tamales and the like, a wrapper folding device comprising a tubular member having a longitudinal slit from end to end for passage of the edges of the wrapper in the folding thereof, and means for bringing the edges of the wrapper to a meeting point for folding one edge thereof over the other edge, comprising a pair of elongated resilient elements, each having one end thereof fastened to the inner wall of the tubular member and directed toward the delivery end of the tubular member, said elements passing one over the other at a point where the edges of the wrapper come together, the free end of one of said elements bearing against the inner wall of the tubular member, and the free end of the other element being directed across said slit and terminating at the end of the tubular member on the outside wall thereof, and a ring enclosing the delivery end of the tubular member.

13. In a machine for making tamales and the like, means for feeding a web to the machine, means for supplying tamale material to the web, a web folder including a tubular member having a longitudinal slit from end to end for passage of the edges of the web in the final folding thereof, said tubular member having its walls parallel and being circular in cross-section from end to end, means for bringing the edges of the web to a meeting point for folding one edge thereof over the other edge, and comprising elongated resilient elements, each having one end thereof fastened to the inner wall of the tubular member and directed toward the delivery end of the tubular member, said elements passing one over the other at a point where the edges of the web come together, the free end of one of said elements bearing against the inner wall of the tubular member and the free end of the other element being directed across said slit and terminating at the end of the tubular member on the outside wall thereof.

14. In a machine for making tamales and the like, a tubular member for imparting to the edges of a continuous wrapping web a double folding effect over tamale material supplied thereto, said tubular member having a longitudinal slit from end to end, the edges of the slit being provided with a guide and strengthening means, said means terminating short of the delivery end of the tubular member, an elongated resilient element fastened to the tubular member at one end thereof and curved over said slit, the free end of said resilient element adapted to bear against the edges of the web and move same under one of said guide means along the slit in the folding of the web, said tubular member having an extension along one edge of said slit from the delivery end thereof inwardly for guiding the web outwardly after passage under said guide means.

FELIX L. WHITE.